Patented June 9, 1936

2,043,899

UNITED STATES PATENT OFFICE 2,043,899

STABILIZING OF CELLULOSE ESTERS

Carl J. Malm, Rochester, N. Y., assignor to Eastman Kodak Company, Rochester, N. Y., a corporation of New York No Drawing. Application April 27, 1932, Serial No. 607,885

5 Claims. (Cl. 260—102)

The present invention relates to the stabilization of cellulose esters by treating with an aldehyde or a ketone at an elevated temperature.

It is well known that cellulose acetate as prepared commercially has been subject to decomposition and instability as recognized for instance in Worden's "Technology of Cellulose Esters" (1916) volume VIII pages 2919-20 in which tests to determine the stability of the cellulose acetates are disclosed. It is disclosed therein that the "stability factor" of a carefully prepared cellulose acetate should not exceed 5. This "stability factor" is determined by ascertaining the amount of apparent acetic acid in grams liberated from 100 gms. of the ester when it is subjected to a temperature of 125° C. for three hours. A current difficulty in cellulose acetate manufacture has been the production of a cellulose acetate which will have sufficient stability for use in the finer arts, such as in the production of photographic film.

Other tests than those disclosed in Worden have also been evolved for determining the stability of cellulose esters, for example the stability of an ester may be determined by applying a fairly severe heat (such as 180° C.) to the ester and observing the time necessary for charring to occur. Obviously the stability of the ester is directly proportional to the time over which the ester resists charring. If the ester is of a stable nature it will resist charring at 180° C. for several hours but in the case of an unstable cellulose ester containing an appreciable amount of combined sulfuric acid, the time in which charring will occur will be merely a matter of minutes.

It is mentioned in the prior art that the stabilization of esters is effected by adding to a completed reaction mixture, an amount of formaldehyde less than that which will cause hydrolysis of the ester. However, the stabilization referred to in that case was not related to the resistance of the ester to decomposition, but rather was directed to the maintenance of the viscosity of the reaction mixture over a considerable period of time. The reason why in that particular case the maintenance of the viscosity of that reaction mixture was desirable was that the esterification "dope" itself was employed to prepare threads or films without any intermediate separation of the ester from the reaction mixture in which it was prepared. Such stabilization in that case related to the maintenance of the viscosity of the esterification dope while on the other hand the present invention is concerned with the prevention of decomposition of a cellulose ester after it has been removed from the reaction mixture.

I have found that when a cellulose ester is treated according to the process of the present invention a product results which is extremely stable to the effects of heat and which has a negligible amount of decomposition according to the stability tests referred to (or any other tests, for that matter). I have found that an organic ester of cellulose may be treated with an aldehyde or a ketone at about 100° F. for a time and the ester which previously exhibited poor and unsatisfactory stability will resist the application of heat for a comparatively long period of time.

My process can be applied only when the instability of the cellulose esters is due to the presence of combined sulfuric acid. Sulfuric acid is the catalyst most commonly employed in the esterification of cellulose and the product formed in such an esterification process will contain some of the cellulose sulfo-acetate which usually forms during the process. It is the presence of this sulfo-acetate in the product formed that detrimentally affects the stability of that product.

In the dope esterification of cellulose the ester formed is usually subjected to hydrolysis while still in the reaction mixture. In this hydrolysis step generally most of the sulfo-acetate is removed or rather converted into the normal acetate. Although my process may be employed to treat hydrolyzed cellulose esters, as a rule this type of ester is sufficiently stable for all practical purposes. With hydrolyzed esters therefore, my stabilizing process may be employed but such application is not essential.

In the fibrous esterification of cellulose, especially when the preparation of the mixed esters is contemplated, it is often desirable to eliminate the hydrolysis step entirely as the fully esterified product formed already has the desired solubilities and also a higher moisture resistance than the unhydrolyzed product. When this hydrolysis step is eliminated the removal of any of the combined sulfuric acid in the ester is unprovided for and the resulting product is unstable to heat.

I have now found that the combined sulfuric acid which may be present in an organic ester of cellulose can be removed by treating the ester with an aldehyde or a ketone for a sufficient period of time. Although the ester might be treated while in solution, it is preferred that the stabilization treatment be carried out on the ester in suspension as this will eliminate any necessity of precipitating out the treated product from the stabilizing bath. This is unusual, as most so-called prior known stabilization processes have been carried out with the cellulose derivatives in dope form, i. e. in solution.

As has been pointed out herein my invention may be performed by treating an organic ester of cellulose preferably in undissolved form with a bath substantially comprising an aldehyde or a ketone at a temperature of approximately 80-120° F. The esters which may be stabilized by my invention may be either simple esters such as cellulose acetate, cellulose propionate or cellulose butyrate or mixed esters, such as cellulose acetate-propionate, cellulose acetat-butyrate, cellulose acetate-stearate, etc. The esters stabilized by my invention may be either those prepared by "dope" esterification processes or those in which the cellulose ester retains the fibrous form of the original material by the addition to the esterification bath of a non-solvent such as carbon tetrachloride, benzene or an ether of a higher alcohol having a boiling point above 70° C., the use of the latter non-solvent having been disclosed and claimed in application Serial No. 590,509 filed Feb. 2, 1932 of myself and C. L. Fletcher.

The following example illustrates a specific embodiment of my invention applied to the stabilization of a fibrous cellulose triacetate or unhydrolyzed cellulose acetate:

10 parts of a fibrous cellulose triacetate, containing about .1% of combined sulfuric acid was suspended in approximately 150 parts of paraldehyde for about 24 hours at 100° F. At the end of this time the acetate was filtered off, washed and dried. An analysis showed that the resulting product was entirely free from any combined sulfuric acid.

The original fibrous cellulose triacetate was tested for stability by subjecting it to a temperature of 180° C. It was found that at that temperature the original material started to char in 10 minutes. The stabilized ester resulting from the process of the above example was also tested for stability by subjecting it to a temperature of 180° C. under the same conditions as before. This product showed no discoloration at that temperature over a period of 10 hours.

Other aldehydes such as butyraldehyde, benzaldehyde and furfural were each employed in stabilizing processes similar to the above and results of a similar nature were obtained. Ketones, as for example methyl ethyl ketone and cyclohexanone were each employed instead of an aldehyde in stabilizing processes similar to the above and they were found to have a similar stabilizing effect on organic esters of cellulose. Acetone was also tried in a process similar to the above but it was found that it was necessary that the reaction mass be under pressure for instance by the use of an autoclave or kept under reflux to obtain a stabilizing effect, as at atmospheric pressure the acetone readily evaporates at temperatures much above room temperature. Acetone however, has a too strong solvent action on most cellulose esters to be practical in this process. Obviously if desired, an autoclave may be employed when any one of the aldehydes or ketones are employed; however, as a rule the use of that apparatus will be found unnecessary.

Where the term "elevated temperature" is used herein it is to be understood to refer to those temperatures above room temperature or 70° F. which are suitable for the carrying out of the present invention. As the present invention is usually performed a temperature below 120° F. will be sufficient; however, in certain cases, temperatures above 120° F. might be employed without adversely affecting the final product.

I claim as my invention:

1. The stabilizing of an organic acid ester of cellulose containing sulfo-groups which comprises removing those groups by treating at a temperature of approximately 80-120° F. for approximately twenty-four hours with a bath substantially comprising a compound having the formula:

where R may be either an alkyl, aryl or aralkyl group and X may be either a hydrogen, alkyl, aryl or aralkyl group.

2. The stabilizing of an organic acid ester of cellulose containing sulfo groups which comprises treating the ester at a temperature of approximately 80-120° F., until the sulfo groups are substantially completely removed, with a bath substantially comprising a compound having the formula:

where R may be either an alkyl, aryl or aralkyl group and X may be either a hydrogen, alkyl, aryl or aralkyl group.

3. The stabilizing of an organic acid ester of cellulose containing sulfo groups which comprises treating that ester at a temperature approximately 80-120° F. with a bath substantially comprising an aldehyde having a plurality of carbon atoms, until the sulfo groups are substantially completely removed.

4. The stabilizing of cellulose acetate containing sulfo groups by treating it at a temperature of approximately 80-120° F., until the sulfo groups are substantially completely removed, with a bath substantially comprising a compound having the formula:

where R may be either an alkyl, aryl or aralkyl group and X may be either a hydrogen, alkyl, aryl or aralkyl group.

5. The stabilizing of an organic acid ester of cellulose containing sulfo groups by treating it at a temperature of approximately 80-120° F. with a bath substantially comprising paraldehyde, until the sulfo groups are substantially completely removed.

CARL J. MALM.